Jan. 6, 1970   L. D. ISLEY ET AL   3,487,638

ENVIRONMENTAL RATE OF TURNTABLE

Filed Sept. 13, 1966

INVENTORS
LOREN D. ISLEY
WILLIAM R. WIGGIN
WINTHROP B. OSGOOD, JR.

BY Richard J. Seligman

ATTORNEY

United States Patent Office 3,487,638
Patented Jan. 6, 1970

3,487,638
ENVIRONMENTAL RATE OF TURNTABLE
Loren D. Isley, Nashua, N.H., William R. Wiggin, South Hamilton, Mass., and Winthrop B. Osgood, Jr., Nashua, N.H., assignors to Sanders Associates, Inc., Nashua, N.H., a corporation of Delaware
Filed Sept. 13, 1966, Ser. No. 579,088
Int. Cl. G01c 25/00; G01l 25/00
U.S. Cl. 73—1           3 Claims

ABSTRACT OF THE DISCLOSURE

A rotatable table for testing the performance of components mounted thereon under various controlled environmental conditions including angular acceleration, vibration and shock. Circuitry is included by which the rate of rotation can be selected and controlled. The table is fastened to a shaft which is mounted for rotation by matched precision preloaded pairs of bearings having their inner and outer races offset, thus permitting vibration and shock to be transmitted to the table with virtually unity transmissibility.

---

This invention relates to a rate of turntable and, more particularly, to a rate of turntable which can function properly, providing accurate angular rates to components under test, while being subjected to severe mechanical environments, such as vibration and shock.

In order to determine properly the susceptibility of inertial guidance and rate measuring components, such as, for example, rate gyros for missiles or aircraft uses, to severe mechanical environments of shock and vibration, it is advantageous to maintain the components to be tested in their operating state. Thus, in particular applications, it is desirable that environmental conditions of shock and vibration be super-imposed upon conditions of rate of turn, angular acceleration or centrifugal acceleration.

Presently available rate tables are operated at a constant load of local gravity, and could not provide accurate rate of turn of the tested device under mechanical environments of shock and vibration such as the device is subjected to when operating in its local environment. The conventional rate of turntables would be shocked if vibrated at greater than 1g loads, causing relative movement between the vibrated table and its housing and eventually causing destruction of its bearing system. For example, if the table were to be vibrated sinusoidally, it would be shocked at each peak of the sine wave; and the vibrating motion could not be transmitted to the table top at anything approaching unity transmissibility.

Accordingly, it is an object of this invention to provide an environmental rate of turntable.

It is another object of this invention to provide a rate of turntable to which environmental stresses of vibration and shock can be applied while maintaining a specified rate condition.

It is a further object of this invention to provide a rate of turntable in which mechanical environments of shock and vibration can be imposed at one end thereof and transmitted to the other end with substantially unity transmissibility.

It is an additional object of this invention to provide a system for accurately controlling a rate table which is designed to provide accurate rate of turn under mechanical environmental stresses.

In carrying out one embodiment of our invention, we employ a rate table with speed control for forming a highly accurate velocity servo, wherein speed is proportional to input voltage. The rate table is designed without mechanical gears or ball-disc drives, providing smooth speed control, long life and reliable operation. The rate table itself is a direct drive rate table featuring high accuracy and accurate speed control.

The drive assembly for the rate table incorporates a low-speed DC motor and a high-precision DC tachometer. The armatures (rotors) of both the motor and tachometer are directly coupled to a large-diameter shaft, which in turn is supported in the housing by two sets of precision preloaded ball bearings. This system is designed to subject a test item to a specified shock, vibration, and acceleration environment under a rate condition by applying the environment to the base of the rate table. It is therefore essential that the transmissibility from the rate table base to the table top, where the component to be tested is mounted, be as close to unity as possible. This requirement demands that the bearing system of the rotating portion of the rate table be very stiff to obtain a high natural frequency. The stiffness is obtained by using two sets of preloaded precision ball bearings. The bearings employed in this embodiment are two sets of matched pairs with an offset of the outer and inner races, so that when the races are loaded to a line-to-line condition, a known preload condition is attained.

The above-mentioned and other features and objects of this invention will become more apparent by reference to the following description, taken in conjunction with the accompanying drawings, in which.

Figures 1, 2:
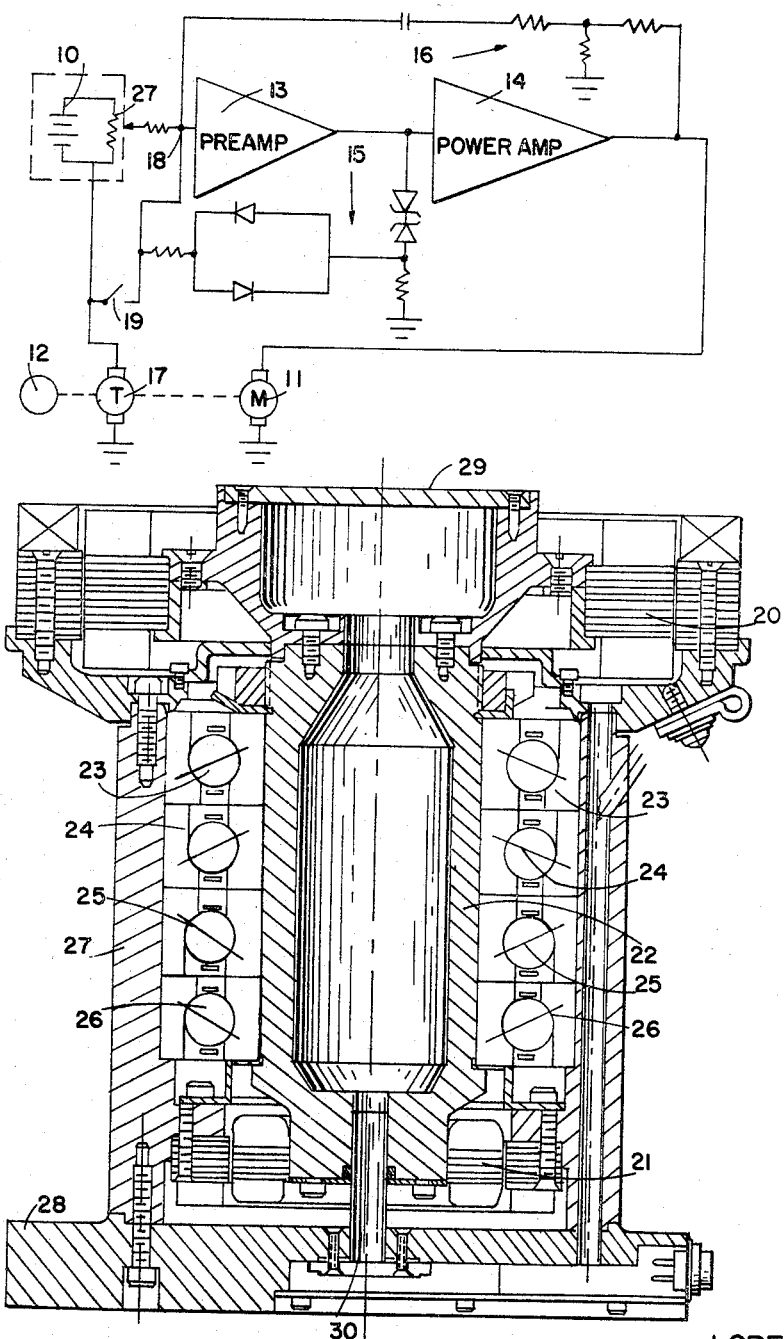
FIG. 1 is a block diagram of an environmental rate of turntable system.
FIG. 2 is a front sectional view of a rate table employed in the system of FIG. 1.

Referring now to FIG. 1, there is illustrated thereby a block diagram showing the electrical control for a rate of turntable according to the invention. A reference voltage source 10 and precision voltage divider 27 are illustrated as an electrical input employed to drive a motor 11, which in turn drives a rate table 12, described in detail hereinafter. Although electrical source 10 is shown as a DC voltage, this is for illustration purposes only. Any signal, such as a sine wave or sawtooth, could be used, provided that the acceleration rate of motor 11 is not exceeded. That is, any characteristic shape of electrical signal could be employed to drive DC motor 11, and thus provide a particular respective angular motion to the rate table driven by motor 11. The only limitation is that the time between electrical level changes cannot exceed the response time of the DC motor if it is to accurately reproduce the electrical characteristic as an angular characteristic of rotation of the table.

Electrical input 18 is applied to a preamplifier 13 from the potentiometer 27. The output from preamplifier 13 is further amplified at a power amplifier 14, the output of which is applied to run motor 11. A clamping circuit 15 is provided to hold preamplifier 13 from going into saturation. An AC feedback system, generally indicated at 16, is used to provide system stabilization by preventing system oscillations.

Preamplifier 13, in this preferred embodiment, is an operational amplifier having a very high gain, to amplify the very small signals incident at the input thereof. The reason why the input signals are of very low values will be readily seen hereinafter. The gain of preamplifier 13, in one embodiment, is of the order of $10^5$.

A tachometer 17 provides a voltage output which is proportional to the angular velocity of the rate table. The tachometer output voltage provides negative feedback to the system, and is summed at potentiometer 27 with the output from the precision voltage divided reference voltage to provide the low value of error signal, input 18.

A switch 19 provides dynamic braking for rate table 12 by shorting the output of the precision voltage divider network 27, thus causing only the negative feedback output from tachometer 17 to be applied to the input of preamplifier 13. This will reverse the input signal to motor 11 and cause it to come to an abrupt stop, often required in specific test specifications.

Rate table 12 is illustrated in detail in FIG. 2. Rate table 12 consists of a DC torque motor 20 directly coupled to a high-precision DC tachometer 21. Motor 20 and tachometer 21 are coupled via a relatively light hollow shaft 22, which is arranged for rotation with bearings 23, 24, 25, and 26. These parts are all contained within a housing 27 which is firmly fixed to a base member 28. A rate table top 29 is arranged upon shaft 22 for rotation therewith. Any component to be tested is placed or mounted upon rate table top 29. Although table top 29 is shown as having a particular diameter, this is exemplary only, and the top could be smaller or larger, depending upon the size of rate component which is to be placed thereupon for testing. A slip ring and brush arrangement generally designated at 30 provides electrical conduction between the bottom and top portions of the rate table structure. Suitable fastening devices, such as screws and ring clamps, are used to maintain the individual components of the rate table in proper relationship.

One of the important features of the invention, which enables the rate table 12 to be used under severe mechanical environmental stresses, lies in the selection of bearings 23, 24, 25, and 26. These bearings are matched precision preloaded pairs having their inner and outer races offset. This provides high spring constants, thus permitting the application of environmental stresses at the base 28 to be transmitted to the table top 29 with virtually unity transmissibility.

In order to provide unity transmissibility over any practical frequency range, it is necessary to operate below the natural frequency of the rate table, which can be represented by $$\omega_m = \sqrt{K/m}$$

where $m$ represents the mass of the rotating structure, including any component placed upon rate table top 29. Consequently, since the mass is fixed, to increase the value of the natural spring frequency $\omega_m$, the spring constant $K$ which, in the device illustrated is the spring constant of bearings 23–26, must be increased. It is the prestressing of the bearings that provides the stiffness for the system, and spring constant equivalents in excess of $5 \times 10^6$ pounds per inch have been attained. The direction in which respective bearings are loaded in this exemplary embodiment is illustrated in FIG. 2.

While we have described above the principles of our invention in connection with specific apparatus, it is to be clearly understood that the specification is presented by way of example and not as a limitation of the scope of our invention.

We claim:

1. A rate of turntable to which environmental stresses may be applied while said table is functioning at a prescribed rate of turn or acceleration, comprising:

a housing;

two sets of matched pairs of bearings which are preloaded by offsetting the inner and outer races thereof, the bearings in each pair being preloaded by substantially identical amounts in different directions, a drive shaft arranged for rotation with said bearings, a table top arranged upon said shaft for rotation therewith, and means for driving said shaft at a predetermined rate of turn or acceleration, said drive means including a motor and a tachometer, the armatures of which are coupled to said drive shaft, said drive means further including a voltage source, the output of which, combined with the output from said tachometer, is coupled to said motor.

2. A rate of turntable as defined in claim 1, further including means for amplifying said combined output.

3. A rate of turntable as defined in claim 2, further including means for providing dynamic braking for said motor, including means for decoupling said voltage source, whereby only the output from said tachometer is coupled to said motor.

References Cited

UNITED STATES PATENTS

| | | | |
|---|---|---|---|
| 2,783,653 | 3/1957 | Brown | 73—1 X |
| 2,827,790 | 3/1958 | Brown. | |
| 2,882,717 | 4/1959 | Brown | 73—1 |
| 3,164,978 | 1/1965 | Sharman et al. | 73—1 |
| 3,205,697 | 9/1965 | Parsons et al. | 73—1 |
| 3,226,972 | 1/1966 | Natanson | 73—1 |

OTHER REFERENCES

Synchros, Norden-Ketay, Bulletin No. 396, p. 8, Oct. 14, 1957.

LOUIS R. PRINCE, Primary Examiner

J. W. ROSKOS, Assistant Examiner